Feb. 27, 1923.
T. J. OSBORNE.
WINDING DEVICE.
FILED JULY 8, 1920.
1,447,033.
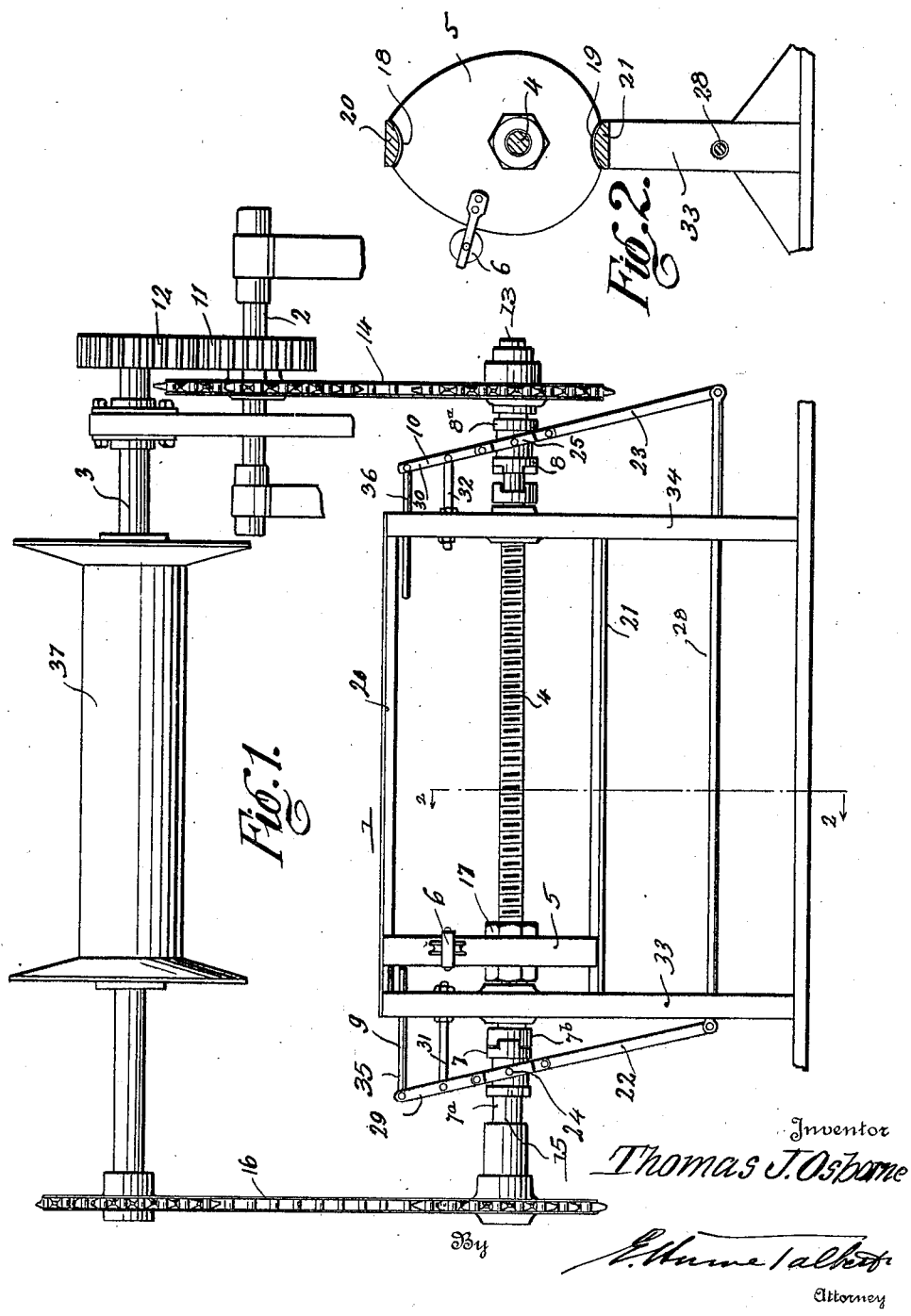

Patented Feb. 27, 1923.

1,447,033

UNITED STATES PATENT OFFICE.

THOMAS J. OSBORNE, OF PREMIER, WEST VIRGINIA, ASSIGNOR OF ONE-HALF TO ALEXANDER IRVINE, OF McDOWELL, WEST VIRGINIA.

WINDING DEVICE.

Application filed July 8, 1920. Serial No. 394,813.

*To all whom it may concern:*

Be it known that I, THOMAS J. OSBORNE, a citizen of the United States, residing at Premier, in the county of McDowell and State of West Virginia, have invented certain new and useful Improvements in Winding Devices, of which the following is a specification.

This invention relates to an automatically operated spool winder and has for its object to provide means whereby a cord or cable of any character may be evenly and smoothly wound upon a spool or drum.

Another object of the invention is to provide means for automatically reversing a threaded bar for controlling a cable or cord guide.

A still further object of the invention is to provide a novel mechanism for simultaneously operating a pair of clutches.

With the above and other objects in view I have invented the device illustrated in the accompanying drawings in which:

Figure 1 is an elevational view of my guide control mechanism, and

Figure 2 is an elevational view from one end of the device.

It is to be understood that this device is to be used for the purpose of winding any cable, rope, cord or thread regularly, evenly and smoothly upon any spool, drum or cylinder.

Like reference characters indicate like parts throughout the following specification and in the drawings in which 1 indicates a cable winder which consists of a drive shaft 2, a driven shaft 3, a threaded shaft 4, a traveler 5, carrying a cable guide 6, clutches 7 and 8 and clutch operators 9 and 10. The shafts 2 and 3 are connected by a pair of like gears 11 and 12. The stub shaft 13 operating the clutch member 8ª is driven by the shaft 2 through the medium of a sprocket wheel and chain transmission 14 and the stub shaft 15 operating the clutch member 7ª is driven by the shaft 3 through the medium of the sprocket wheel and chain transmission 16. The traveler 5 is fixedly mounted upon a nut 17 operating on the threaded shaft 4. The member 5 is oblong and its ends are provided with arcuate grooves 18 and 19 slidably mounted over the guide bars 20 and 21 whereby rotation of member 5 is obviated. The clutch controllers on operators 9 and 10 consist of levers 22 and 23 having yokes at 24 and 25 operating in the grooves 26 and 27 of the clutch members 7ª and 8ª, their lower ends being pivoted to the shift rod 28. The upper ends 29 and 30 of said levers have guide bars 31 and 32 connected thereto which slidably operate through openings provided in the pedestals 33 and 34, and lever operating bars 35 and 36 which slidably operate through openings provided in said pedestals and which are adapted to project into the path of movement of said traveler 5.

The operation of the cable guide mechanism is automatic and very simple. As shown in Figure 1 of the drawings the traveler 5 is in the act of throwing lever 22 by pushing against bar 35, thus disconnecting clutch member 7ª from clutch member 7ᵇ and said member 7ª acting as a fulcrum causes lever 22 to shift rod 28 to throw lever 23 to connect clutch members 8ª and 8ᵇ thus reversing the threaded shaft 4 causing a reverse motion of traveler 5 and throwing the bar 36 in the path of said member 5 when it shall have reached this end of the shaft 5. The transmission 14, drives shaft 4 in one direction and the transmission 16 drives it in the opposite direction, thus operating the traveler 5 and with it the cable guide 6 back and forth upon the shaft 4. A spool or drum 37 is mounted on the shaft 3 which parallels screw shaft 4, and upon which a cable is to be wound.

Having now described my invention, that which I claim as new and desire to obtain by Letters Patent is:

1. In a cable guide, consisting of a pair of spaced upright members, a transverse shaft spanning the two and terminally journalled in the same, stub shafts disposed adjacent opposite ends of the said transverse shaft which is formed with a continuous circumferential thread, clutch members carried by the said stub shafts for alternately operatively connecting them with the threaded shaft, means for rotating the stub shafts in opposite directions, guide bars spanning the pedestal above and below the transverse shaft, a traveller movable longitudinally of said guides and engaged by the transverse or threaded shaft, levers having pivotal connections with pedestals and operatively engaged with the clutches, and lever operating bars having terminal pivotal connections with the said clutch operating levers and passing slidably through said pedestal for alternative engagement with the traveller in the manner and for the purpose specified.

2. In a cable guide, consisting of a pair of spaced upright members, a transverse shaft spanning the two and terminally journalled in the same, stub shafts disposed adjacent opposite ends of the said transverse shaft which is formed with a continuous circumferential thread, clutch members carried by the said stub shafts for alternately operatively connecting them with the threaded shaft, means for rotating the stub shafts in opposite directions, guide bars spanning the pedestal above and below the transverse shaft, a traveller movable longitudinally of said guides and engaged by the transverse or threaded shaft, levers having pivotal connections with pedestals and operatively engaged with the clutches, lever operating bars having terminal pivotal connections with the said clutch operating levers and passing slidably through said pedestal for alternative engagement with the traveller, and a shifter rod having terminal pivotal connections with said levers at the ends opposite the lever operating bars, whereby the said clutches may be alternately but manually operated independently of said traveller.

In testimony whereof I affix my signature in the presence of two witnesses.

THOMAS J. OSBORNE.

Witnesses:
ALEX J. WEDDERBURN,
ALFRED O. H. ABEL.